(12) United States Patent
Roh et al.

(10) Patent No.: US 12,515,729 B2
(45) Date of Patent: Jan. 6, 2026

(54) STEERING WHEEL AND VEHICLE INCLUDING THE SAME

(71) Applicants: Hyundai Motor Company, Seoul (KR); Kia Corporation, Seoul (KR); Joyson Safety Systems Korea Co., Ltd., Hwaseong-si (KR)

(72) Inventors: Kyeong Boo Roh, Hwaseong-Si (KR); Sang Gyu Yoon, Incheon (KR); Byung Woo Noh, Seoul (KR); Ji Su Hwang, Yongin-Si (KR); Beom Jung Kim, Hwaseong-Si (KR); Seung Min Kim, Bucheon-Si (KR); Seung Woo Jeong, Hwaseong-Si (KR)

(73) Assignees: Hyundai Motor Company, Seoul (KR); Kia Corporation, Seoul (KR); Joyson Safety Systems Korea Co., Ltd., Hwaseong-si (KR)

( * ) Notice: Subject to any disclaimer, the term of this patent is extended or adjusted under 35 U.S.C. 154(b) by 0 days.

(21) Appl. No.: 18/930,886

(22) Filed: Oct. 29, 2024

(65) Prior Publication Data
US 2025/0326424 A1    Oct. 23, 2025

(30) Foreign Application Priority Data
Apr. 23, 2024    (KR) .................. 10-2024-0053786

(51) Int. Cl.
*B62D 1/183*    (2006.01)
*B62D 1/06*    (2006.01)
*B62D 1/181*    (2006.01)

(52) U.S. Cl.
CPC ............... *B62D 1/183* (2013.01); *B62D 1/06* (2013.01); *B62D 1/181* (2013.01)

(58) Field of Classification Search
CPC .......... B62D 1/183; B62D 1/06; B62D 1/181
See application file for complete search history.

(56) References Cited

U.S. PATENT DOCUMENTS

| | | | |
|---|---|---|---|
| 11,148,700 B1 * | 10/2021 | Helmstetter | B60R 21/203 |
| 2020/0198684 A1 * | 6/2020 | Murray | B62D 1/187 |
| 2021/0316777 A1 * | 10/2021 | Kwon | B62D 1/181 |
| 2023/0347967 A1 | 11/2023 | Roh et al. | |
| 2024/0253689 A1 * | 8/2024 | Sang | B62D 1/08 |

FOREIGN PATENT DOCUMENTS

| | | | | |
|---|---|---|---|---|
| CN | 215883789 U * | 2/2022 | ............... | B62D 1/06 |
| DE | 102019134898 A1 | 6/2021 | | |
| FR | 2861657 A1 * | 5/2005 | ......... | B60R 11/0235 |
| KR | 10-2023-0153551 A | 11/2023 | | |

(Continued)

*Primary Examiner* — Drew J Brown
(74) *Attorney, Agent, or Firm* — Morgan Lewis & Bockius LLP

(57) ABSTRACT

A steering wheel includes an armature body; a wheel rim coupled to the armature body to be folded, a slider provided on the armature body to move linearly while coupled to the wheel rim to be rotatable about a first rotation axis, a link including a first end portion rotatably coupled to the wheel rim about a second rotation axis, different from the first rotation axis, and a second end portion coupled to the armature body to be rotatable about a third rotation axis, and a driving unit engaged to the slider and providing power for a linear motion to the slider.

19 Claims, 14 Drawing Sheets

(56) References Cited

FOREIGN PATENT DOCUMENTS

| KR | 10-2632529 B1 | 2/2024 | | |
|----|---|---|---|---|
| KR | 20240103146 A | * 7/2024 | | |
| WO | WO-2018060443 A1 | * 4/2018 | ............... | B62D 1/08 |
| WO | WO-2021211912 A1 | * 10/2021 | ........... | B60R 21/203 |
| WO | WO 2023-005571 A1 | 2/2023 | | |
| WO | WO-2023174651 A1 | * 9/2023 | ............... | B62D 1/10 |

\* cited by examiner

STEERING WHEEL AND VEHICLE INCLUDING THE SAME

CROSS-REFERENCE TO RELATED APPLICATION(S)

The present application claims priority to Korean Patent Application No. 10-2024-0053786 filed on Apr. 23, 2024, the entire contents of which is incorporated herein for all purposes by this reference.

BACKGROUND OF THE PRESENT DISCLOSURE

Field of the Present Disclosure

The present disclosure relates to a steering wheel and a vehicle including the same, and more particularly, to a foldable steering wheel capable of providing a convenient space for a driver in a vehicle in a stopped state or ensuring driver convenience when entering or exiting the vehicle.

Description of Related Art

In general, a steering wheel is a steering device controlling a moving direction of a vehicle. While traveling, a driver always holds the steering wheel so that the vehicle may travel in the direction the driver expects. Meanwhile, in a situation in which a driven vehicle is in a stopped state, steering is not required but the steering wheel is disposed in its original location, so space utilization is very poor because free space cannot be provided to the driver.

Thus, an easy access mode is applied in which the steering wheel moves up or the seat is pushed back when the driver enters or exits a vehicle, but a lower rim of the steering wheel still takes up a lot of space in the driver's seat, and when charging an electric vehicle or driving the vehicle autonomously, space utilization of the driver is still degraded due to the rim portion of the steering wheel in the driver's seat.

To improve this, there is growing demand for a foldable steering wheel securing space in the driver's seat by rotating the rim portion of the steering wheel.

However, the rim portion of the foldable steering wheel of the related art is rotated by transmitting power of a motor to a gear, and due to the clearance of the gear, it may be difficult to set the precise angle of the rim, and the repeated use of the rim may increase the clearance to cause the rim to shake. Furthermore, a separate locking device is required to prevent the rim from being folded while driving, so that the package with the overall structure is bound to be significantly complicated. Furthermore, two right and left motors should be used to balance the rotation or double the control.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a foldable steering wheel configured for providing operational safety and consistency through a simplified structure, while simultaneously resolving power transmission and a locking structure.

The purpose of the present disclosure is not limited to the purposes mentioned above, and other purposes not mentioned will be clearly understood by those skilled in the art from the description below.

According to an aspect of the present disclosure, a steering wheel includes: an armature body; a wheel rim coupled to the armature body to be foldable; a slider provided on the armature body to move linearly while coupled to the wheel rim to be rotatable about a first rotation axis; a link including a first end portion rotatably coupled to the wheel rim about a second rotation axis, different from the first rotation axis, and a second end portion coupled to the armature body to be rotatable about a third rotation axis; and a driving unit engaged to the slider and providing power for a linear motion to the slider.

Two sliders may be provided on both sides of the steering wheel.

The armature body may include a guide member, and the slider moves linearly inside the guide member.

The guide member may be provided together with a gearbox accommodating the driving unit.

The first rotation axis may move together with the slider.

The second rotation axis may move according to the motion of the slider.

The third rotation axis may be fixed to the armature body.

The first rotation axis, the second rotation axis, and the third rotation axis may be provided in parallel.

The driving unit may include: a rotary motor; a worm wheel connected to the rotary motor; and a worm gear engaged to the worm wheel, wherein the slider may be coupled to move linearly along a shaft connected to the worm gear.

An internal surface of the slider and an external surface of the shaft selectively include a female thread or a male thread and may be mutually coupled together so that the slider moves linearly by rotation of the shaft.

Two sliders may be provided, and two worm wheels and two worm gears may be connected to first and second sides of the rotary motor, respectively.

The guide member may be provided together with a gearbox accommodating the driving unit, and the gearbox may be provided in a U-shape.

The guide member may include an opening parallel to a moving direction of the slider, and the slider implementing the first rotation axis and the wheel rim may be connected through the opening.

The second rotation axis may move both in a moving direction of the slider and in a direction, perpendicular to the moving direction of the slider.

According to another aspect of the present disclosure, a vehicle includes: a body including a driver's seat; and the steering wheel according to an exemplary embodiment of the present disclosure provided in front of the driver's seat for steering.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
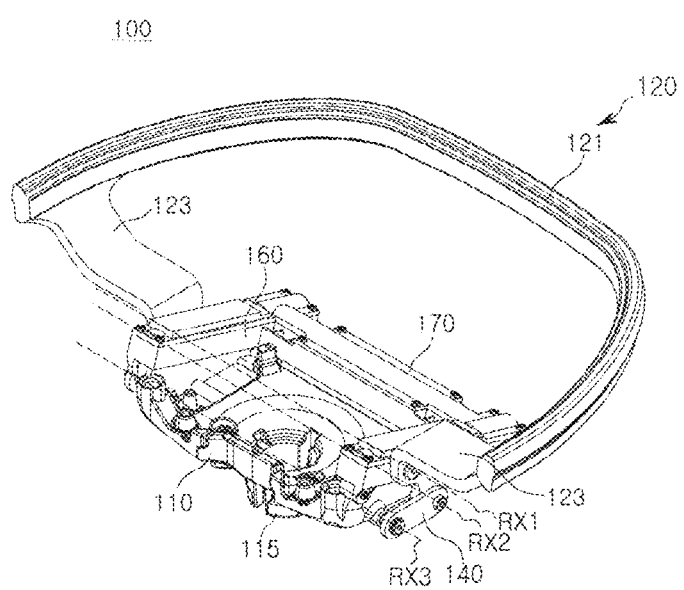
FIG. 1 is a perspective view of a steering wheel according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the invention(s) will be described in conjunction with exemplary embodiments of the present disclosure, it will be understood that the present description is not intended to limit the invention(s) to those exemplary embodiments. On the contrary, the invention(s) is/are intended to cover not only the exemplary embodiments of the present disclosure, but also various alternatives, modifications, equivalents and other embodiments, which may be included within the spirit and scope of the invention as defined by the appended claims.

While the present disclosure may be modified in various ways and take on various alternative forms, predetermined embodiments thereof are illustrated in the drawings and described in detail below. However, it should be understood that there is no intent to limit the present disclosure to the particular forms disclosed, but on the contrary, the present disclosure covers all modifications, equivalents, and alternatives falling within the spirit and scope of the present disclosure.

It will be understood that, although the terms "first," "second," etc. may be used herein to describe various elements, these elements should not be limited by these terms. These terms are only used to distinguish one element from another. For example, a first element could be termed a second element, and a second element could similarly be termed a first element without departing from the scope of the present disclosure. As used herein, the term "and/or" includes any and all combinations of at least one of the associated listed items.

The terms, such as "unit, part, portion, etc." may be used to describe various components, but the components should not be limited by these terms. The above terms may refer to not only physically/visually distinct components, but also to functions or components of a portion even if the corresponding portion is not clearly divided.

The terms used herein to describe embodiments of the present disclosure is not intended to limit the scope of the present disclosure. The articles "a," and "an" are singular in that they have a single referent, however the use of the singular form in the present specification should not preclude the presence of more than one referent. In other words, elements of the present disclosure referred to in the singular may number one or more, unless the context clearly indicates otherwise. It will be further understood that the terms "comprise," "comprising," "include," and/or "including," when used herein, specify the presence of stated features, numbers, steps, operations, elements, and/or components but do not preclude the presence or addition of one or more other features, numbers, steps, operations, elements, components, and/or groups thereof.

Unless defined in a different way, all the terms used herein including technical and scientific terms include the same meanings as understood by those skilled in the art to which the present disclosure pertains. Such terms as defined in generally used dictionaries should be construed to include the same meanings as those of the contexts of the related art, and unless clearly defined in the application, they should not be construed to have ideally or excessively formal meanings.

In the present specification, vehicles refer to a variety of vehicles that move transported objects, such as people, animals, or goods, from a starting point to a destination. These vehicles are not limited to vehicles that run on roads or tracks. Furthermore, vehicles include not only those that use fossil fuels, such as gasoline, but also those that use electricity stored in batteries or the like and those that use future fuels, such as hydrogen.

In the description below, the terms "anterior," "posterior," "lateral," "front," "rear," "up/down," "above," "upper," "top," "below," "lower," "bottom," "left/right" and the like are defined based on a vehicle or vehicle body. Furthermore, terms, such as first and second may be used to describe various components, but these components are not limited in order, size, location, or importance by terms, such as first and second and named for the sole purpose of distinguishing one component from another.

Hereinafter, various exemplary embodiments of the present disclosure are described in more detail with reference to the accompanying drawings.

A steering wheel 100 of the exemplary embodiment utilizes a worm & wheel structure to drive a foldable wheel rim, so power transmission and locking structures are resolved simultaneously, and operational safety and consistency may include a structure in which the number of motors is minimized by use of a double-axis motor located at the bottom portion of the steering wheel.

Figure 2:
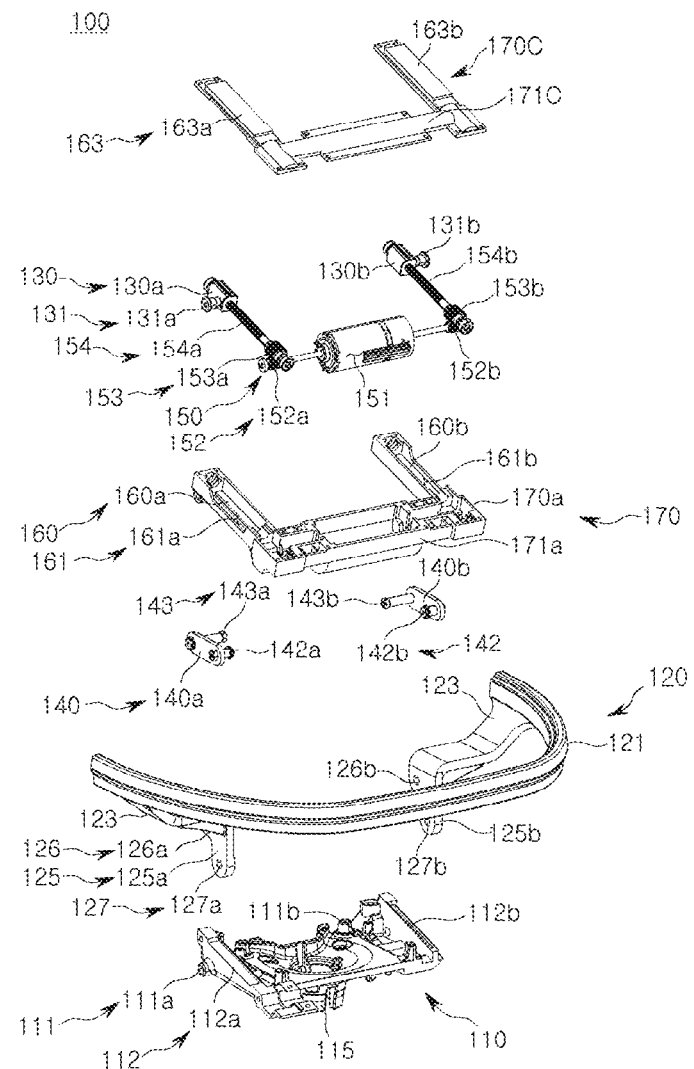
FIG. 2 is an exploded perspective view of a steering wheel according to an exemplary embodiment of the present disclosure.
Figure 3:
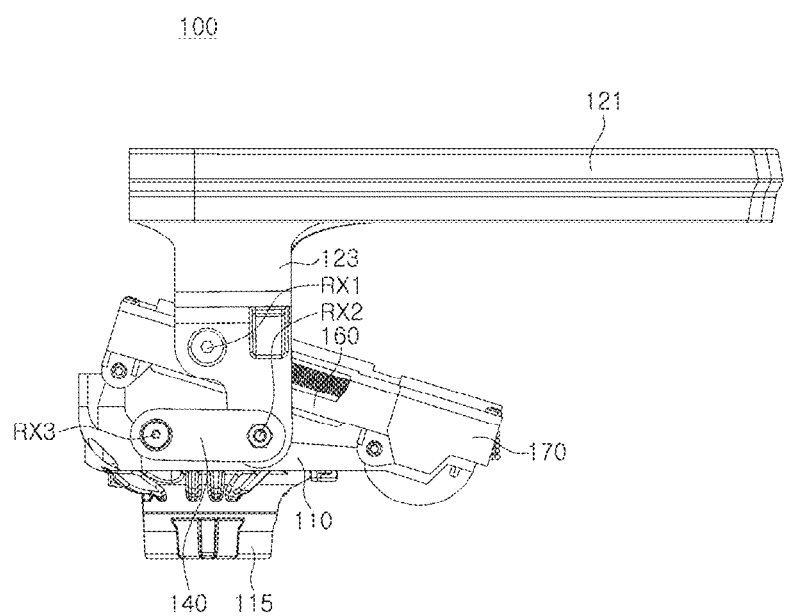
FIG. 3 is a side view of a steering wheel according to an exemplary embodiment of the present disclosure.

Referring to FIG. 1, FIG. 2, and FIG. 3, the steering wheel 100 of the exemplary embodiment of the present disclosure may include a driving unit that simultaneously achieves power transmission and locking structures to implement a foldable steering wheel.

The steering wheel 100 of the exemplary embodiment of the present disclosure may include an armature body 110 and a foldable wheel rim 120 coupled to the armature body 110. Furthermore, to drive the wheel rim 120 to rotate, the steering wheel 100 of the exemplary embodiment of the present disclosure may further include a slider 130, a link 140, and a driving unit 150.

Furthermore, the steering wheel 100 of the exemplary embodiment of the present disclosure may include a guide member 160 facilitating a linear motion of the slider 130 and may further include a gearbox 170 accommodating the driving unit 150 therein.

In other words, the steering wheel 100 of the exemplary embodiment of the present disclosure may include the armature body 110 and the wheel rim 120 foldably provided on the armature body 110. Furthermore, for a folding operation of the wheel rim 120, the steering wheel 100 may further include the slider 130 provided on the armature body 110 to be linearly movable and rotatably coupled to the wheel rim 120 based on the first rotation axis RX1.

In the steering wheel 100 of the exemplary embodiment, the linear motion of the slider 130 may be converted into a rotation motion of the wheel rim 120, and in the present process, a structure which may be naturally fixed even without a separate locking structure may be implemented.

Furthermore, the steering wheel 100 may further include a link 140 including one end portion rotatably coupled to the wheel rim 120 about a second rotation axis RX2, different from the first rotation axis RX1, and the other end portion rotatable to the armature body 110 about a third rotation axis RX3 and the driving unit 150 providing power in a linear motion to the slider 130.

The steering wheel 100 of the exemplary embodiment of the present disclosure may convert the rotation motion of the motor 151 into a structure in which the slider 130 may move linearly using a worm wheel 152 and a worm gear 153, and the slider 130 may be implemented to move linearly along a shaft 154 connected to the worm gear 153.

The armature body 110 may be connected to a steering column of the vehicle, and as the steering column coupled to the armature body 110 rotates, steering of the wheels may be operated. The armature body 110 may include a coupling member 115 connected to the steering column at a lower end portion thereof.

The armature body 110 may include the wheel rim 120 which may be foldable.

The armature body 110 may include the slider 130 linearly movable and rotatably coupled to the wheel rim 120 based on the first rotation axis RX1. Accordingly, a guide surface 112 may be provided on an upper surface of the armature body 110. The guide surface 112 may include a pair of guide surfaces 112a and 112b provided on both sides of the armature body 110. The slider 130 may be provided in direct contact with an upper portion of the guide surfaces 112a and 112b, or a guide member 160 in which the slider 130 is accommodated may be provided above the guide surfaces 112a and 112b and the slider 130 may linearly move on the guide member 160.

Since the wheel rim 120 is provided in the armature body 110 to be foldable, a third rotation hole 111 forming a third rotation axis RX3 used as a rotation axis during folding may be provided. The third rotation hole 111 may include a pair of third rotation holes 111a and 111b that may be provided on both sides of the armature body 110.

The wheel rim 120 may be provided on the armature body 110 to be foldable. The wheel rim 120 may include a rim 121 direct contacting with a driver's hand and rotated for steering and spokes 123 extending inwardly from the rim 121. Furthermore, internal end portions of the spokes 123 may be provided with an extension member 125 including connection portions for rotational driving of the wheel rim 120. The extension member 125 may include a pair of extension members 125a and 125b that may be provided on both sides, and here, since members forming the second rotation axis RX2 or the third rotation axis RX3 to which the wheel rim 120 is connected are formed in pairs on both sides, connection therewith may be facilitated.

The wheel rim 120 may include a first rotation hole 126 implementing the first rotation axis RX1 and a second rotation hole 127 implementing the second rotation axis RX2. In detail, the first rotation hole 126 may include a pair of first rotation holes 126a and 126b and the second rotation hole 127 may include a pair of second rotation holes 127a and 127b.

The first rotation holes 126a and 126b implementing the first rotation axis RX1 and 125b of the wheel rim 120 and second rotation holes 127a and 127b implementing the second rotation axis RX2 may be provided in the extension members 125a and 125b of the wheel rim 120.

The slider 130 may include a pair of sliders 130a and 130b and a first rotation pin 131. The first rotation pin 131 includes a pair of first rotation pins 131a and 131b. The slider 130 may further include a second rotation pin 142. The second rotation pin 142 includes a pair of second rotation pins 142a and 142b. The link 140 includes a pair of links 140a and 140b.

The first rotation holes 126a and 126b may be rotatably connected to first rotation pins 131a and 131b of the sliders 130a and 130b, and the second rotation holes 127a and 127b may be rotatably connected to second rotation pins 142a and 142b of the links 140a and 140b.

Figure 4:
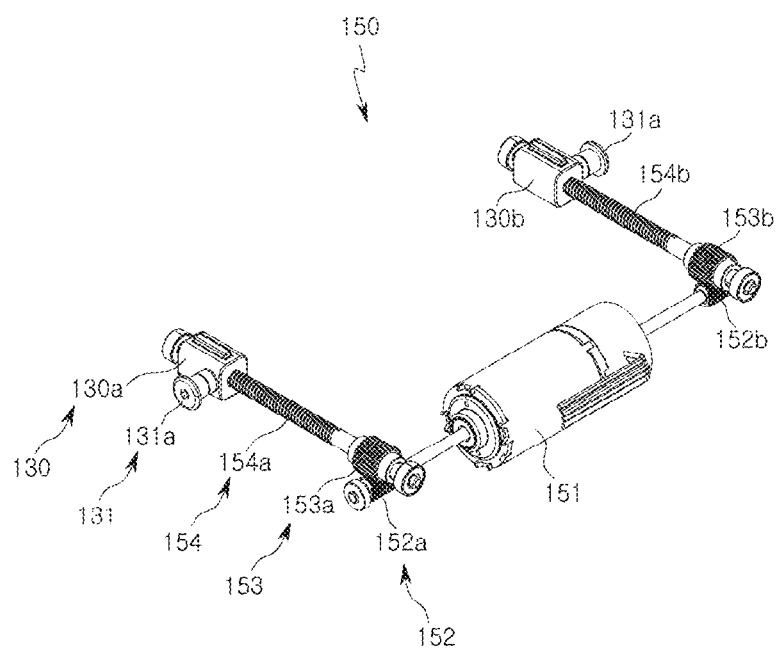
FIG. 4 is a combined perspective view of an exemplary embodiment of a driving unit applied to a steering wheel according to an exemplary embodiment of the present disclosure.
Figure 5:
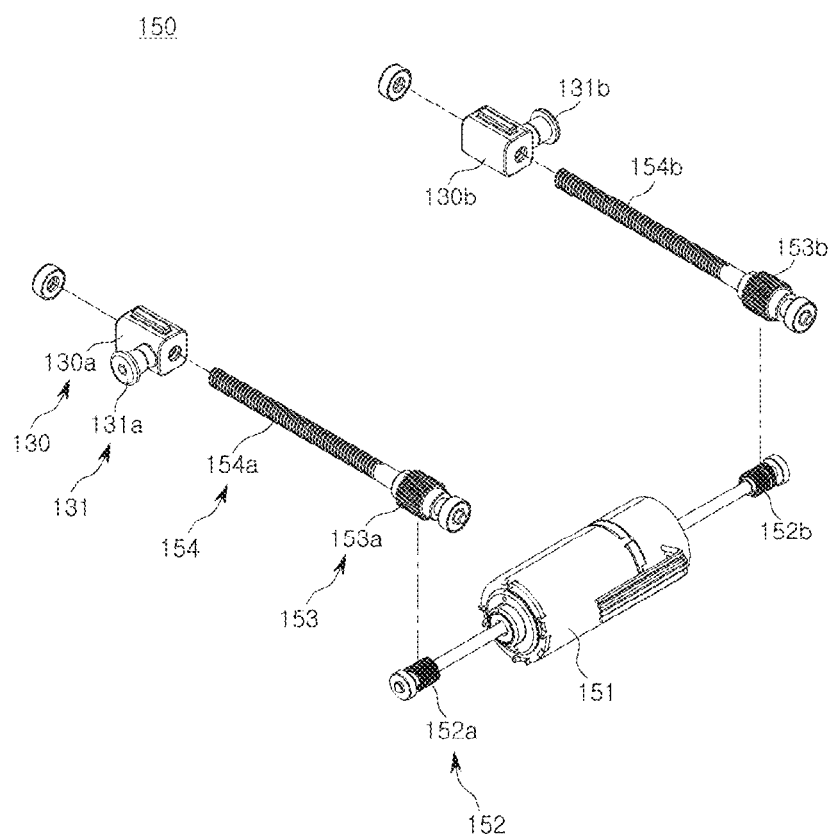
FIG. 5 is an exploded perspective view of an exemplary embodiment of a driving unit applied to a steering wheel according to an exemplary embodiment of the present disclosure.

Referring further to FIG. 4 and FIG. 5, the slider 130 may be provided on the armature body 110 to be linearly movable, and may be rotatably coupled to the wheel rim 120 based on the first rotation axis RX1. Also, since the slider 130 moves linearly in the armature body 110, the first rotation axis RX1 may move linearly along a linear motion of the armature body 110.

The two sliders 130a and 130b may be provided on both sides and may respectively include the first rotation pins 131a and 131b rotatably connected to the first rotation holes 126a and 126b of the wheel rim 120 to form the first rotation axis RX1.

The shaft 154 may include a pair of shafts 154a and 154b. The sliders 130a and 130b may move linearly in the armature body 110 by operation of the driving unit 150, and the sliders 130a and 130b may be fitted into the shafts 154a and 154b of the driving unit 150. Furthermore, internal surfaces of the sliders 130a and 130b and external surfaces of the shafts 154a and 154b may include female threads or male threads, and with these coupled together, the sliders 130a and 130b may move linearly by the rotation of the shafts 154a and 154b. The worm wheel 152 may include a pair of work wheel 152a and 152b, and the worm gear 153 may include a pair of worm gears 153a and 153b. Rotational power of the shafts 154a and 154b may be provided through the motor 151 of the driving unit 150, the worm wheels 152a and 152b, and the worm gears 153a and 153b.

The sliders 130a and 130b may move linearly along guide surfaces 112a and 112b provided on the upper surface of the armature body 110. The slider 130 may be provided in direct contact with the upper portions of the guide surfaces 112a and 112b.

Alternatively, the armature body 110 may be provided with a guide member 160 including a pair of guide members 160a, 160b in which the sliders 130a and 130b are accommodated, and the sliders 130a and 130b may linearly move along guide grooves of the guide members 160a and 160b.

The guide members 160a and 160b may have an opening 161 including a pair of openings 161a and 161b on the outside so that the first rotation pins 131a and 131b of the sliders 130a and 130b are exposed and rotatably connected to the first rotation holes 126a and 126b.

The openings 161a and 161b may be provided in parallel to a moving direction of the sliders 130a and 130b.

The guide members 160a and 160b may be provided together with the gearbox 170 accommodating the driving unit 150. The guide members 160a and 160b may be integrally provided with the gearbox 170 or may be manufactured separately and attached to the gearbox 170. The gearbox 170 may be provided in a U-shape.

The guide members 160a and 160b may further include a guide cover including a pair of guide covers 163a and 163b covering upper portions of the guide members 160a and 160b.

The links 140a and 140b may have one end portion coupled to the wheel rim 120 to be rotatable about the second rotation axis RX2, different from the first rotation axis RX1, and the other end portion coupled to the armature body 110 to be rotatable about the third rotation axis RX3.

The links 140a and 140b may have the second rotation pins 142a and 142b at one end portion and a third rotation pin 143 including a pair of third rotation pins 143a and 143b at the other end portion. Also, the second rotation pins 142a and 142b at one end portion may be rotationally connected to the second rotation holes 127a and 127b of the wheel rim 120 to implement the second rotation axis RX2, and the third rotation pins 143a and 143b at the other end portion may be rotationally connected to the third rotation holes 111a and 111b of the armature body 110 to implement the third rotation axis RX3.

The links 140a and 140b may include a plate shape with a length.

The links 140a and 140b may move along the sliders 130a and 130b moving linearly and may also move in a direction, perpendicular to a straight line in which the sliders 130a and 130b move.

The links 140a and 140b are configured as a lever applying force to rotate the wheel rim 120 linked to the sliders 130a and 130b when the wheel rim 120 moves linearly. In other words, the wheel rim 120 may be folded around the first rotation axis RX1 connected to the sliders 130a and 130b, and when the first rotation axis RX1 moves linearly along the sliders 130a and 130b, the second rotation axis RX2 may move less than the sliders 130a and 130b in a moving direction of the sliders 130a and 130b to pull the wheel rim 120 so that the wheel rim 120 may rotate about the first rotation axis RX1.

Of course, the third rotation axis RX3 is an axis fixed to the armature body 110 and is configured to hold the wheel rim 120 to rotate about the first rotation axis RX1 together with the second rotation axis RX2.

The first rotation shaft RX1, the second rotation shaft RX2, and the third rotation shaft RX3 may be provided side by side, that is, in parallel without overlapping each other. The first rotation axis RX1 may move together with the sliders 130a and 130b, the second rotation axis RX2 may move according to the motion of the sliders 130a and 130b but move less than the sliders 130a and 130b in the moving direction of the sliders 130a and 130b, and the third rotation axis RX3 may be fixed to the armature body 110.

The second rotation axis RX2 may move in the moving direction of the sliders 130a and 130b and in a direction, perpendicular to the moving direction of the sliders 130a and 130b.

The driving unit 150 may provide power for linear motion to the sliders 130a and 130b. The driving unit 150 may transmit rotation force of the motor 151 as rotation force of the two shafts 154a and 154b provided on both sides of the steering wheel.

The driving unit 150 may include the rotary motor 151, the worm wheels 152a and 152b connected to the rotary motor 151, and the worm gears 153a and 153b connected to the worm wheels 152a and 152b. Furthermore, the shafts 154a and 154b into which the sliders 130a and 130b are fitted may be connected to the worm gears 153a and 153b.

The shafts 154a and 154b may rotate together by the rotation of the worm gears 153a and 153b, and accordingly, the sliders 130a and 130b coupled to the shafts 154a and 154b may move linearly according to the shafts 154a and 154b.

The rotary motor 151 may be a double-axis motor. In other words, the rotary motor 151 may be a motor whose rotation shaft is exposed to both sides so that both sides may be used as driving portions. Accordingly, all of the worm wheels 152a and 152b provided on both sides may be driven by the single rotary motor 151.

Accordingly, the rotary motor 151 may be located approximately in the center of the bottom portion of the steering wheel and may provide power for a linear motion to both the sliders 130a and 130b disposed on both sides based on the rotary motor 151 through the worm wheels 152a and 152b and the worm gears 153a and 153b.

The internal surfaces of the sliders 130a and 130b and the external surfaces of the shafts 154a and 154b are provided with female threads or male threads, and when the internal surfaces of the sliders 130a and 130b and the external surfaces of the shafts 154a and 154b are coupled together, the sliders 130a and 130b may move linearly by rotation of the shafts 154a and 154b.

Figure 6:
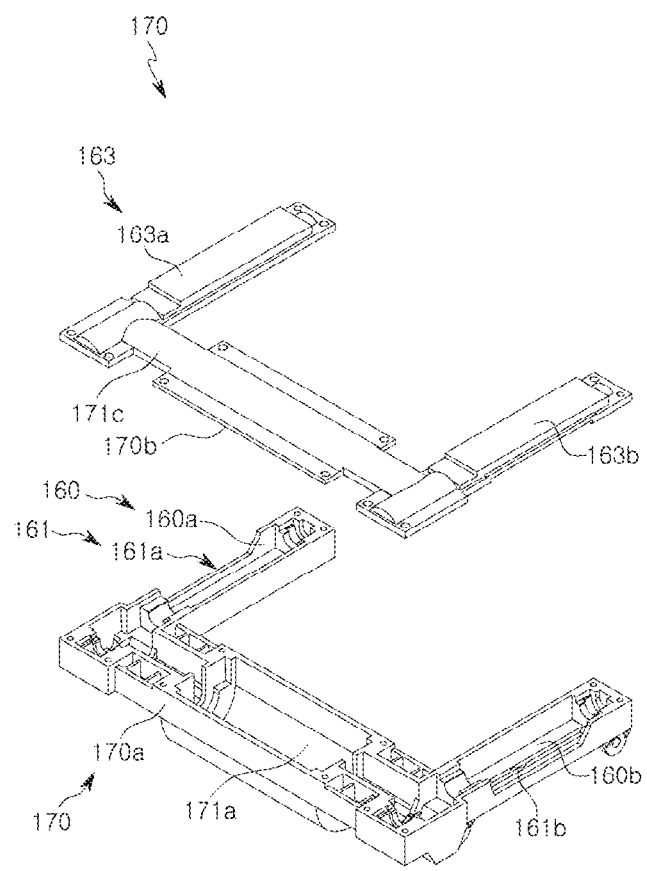
FIG. 6 is an exploded perspective view of an exemplary embodiment of a gearbox applied to a steering wheel according to an exemplary embodiment of the present disclosure.

Referring further to FIG. 6, the driving unit 150 may be accommodated inside the gearbox 170. The gearbox 170 may include a lower housing 170a and an upper housing 170b. The lower housing 170a may accommodate the rotary motor 151, the worm wheels 152a and 152b, the worm gears 153a and 153b, and the shafts 154a and 154b therein, and the upper housing 170b may be coupled to an upper portion of the lower housing 170a and serve as a cover covering the same.

Since the driving unit 150 includes all of the rotary motor 151, the worm wheels 152a and 152b, the worm gears 153a and 153b, and the shafts 154a and 154b, the driving unit 150 may include a "U" shape connecting them. Accordingly, the gearbox 170 may also be provided in the "U" shape.

The gearbox 170 may include a motor housing 171a and a motor cover 171c accommodating the rotary motor 151, the worm wheel 152, and the worm gear 153 therein and may further include the guide member 160 and the guide cover 163 on both sides along which the slide 130 linearly moves along the shaft 154.

Figure 7A:
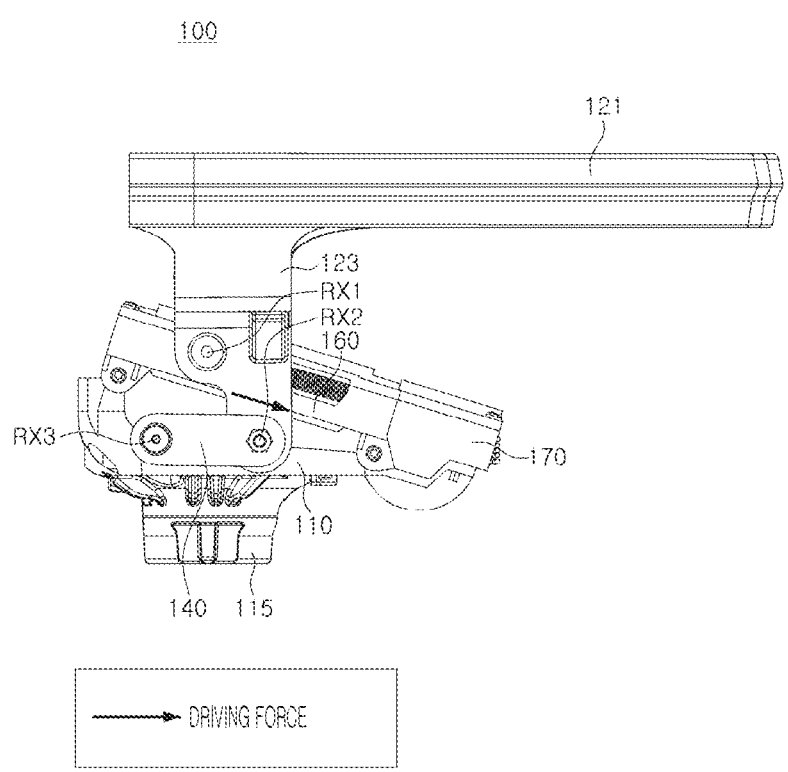
FIG. 7A, FIG. 7B, and FIG. 7C are reference diagrams illustrating a mechanism by which a steering wheel operates according to an exemplary embodiment of the present disclosure.
Figure 7B:
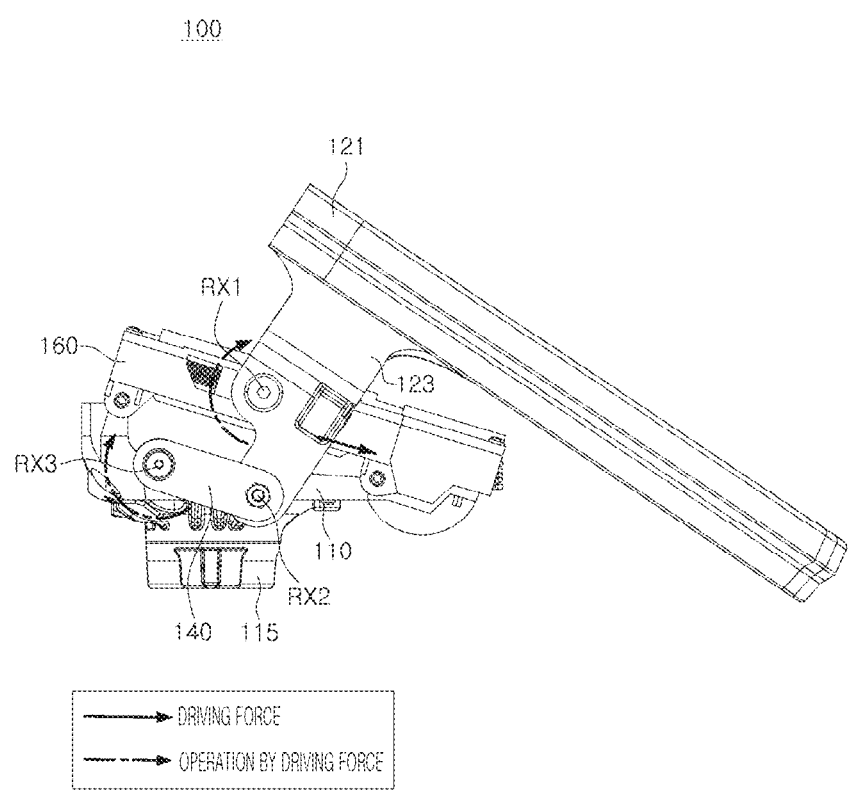
Figure 7C:
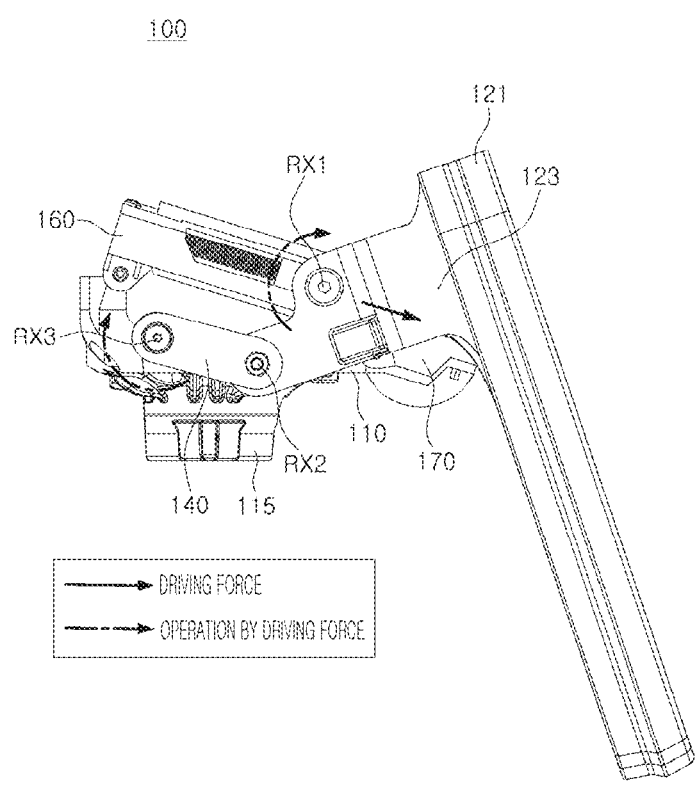

FIG. 7A, FIG. 7B, and FIG. 7C are reference diagrams illustrating a mechanism by which a steering wheel operates according to an exemplary embodiment of the present disclosure.

Referring to FIG. 7A, as power is transmitted along the worm wheels 152a and 152b, the worm gears 153a and 153b, and the shafts 154a and 154b by providing driving force of the rotary motor 151 of the driving unit 150, the shafts 154a and 154b may rotate and the sliders 130a and 130b may begin to form a linear motion in an inward direction of the wheel rim 120.

Referring to FIGS. 7B and 7C, the first rotation axis RX1 also moves according to the linear motion of the sliders 130a and 130b, and as the second rotation axis RX2 held by the fixed third rotation axis RX3 and less moving than a movement direction of the first rotation axis RX1 is configured as a lever, an extension member 125 of the wheel rim 120 may be pulled and the wheel rim 120 may rotate about the first rotation axis RX1 to be folded. Referring to FIG. 8A, FIG. 8B, FIG. 8C, FIG. 8D and FIG. 8E, a vehicle 1000 according to an exemplary embodiment of the present disclosure may include a steering wheel 100 according to the exemplary embodiment of the present disclosure.

Figure 8A:
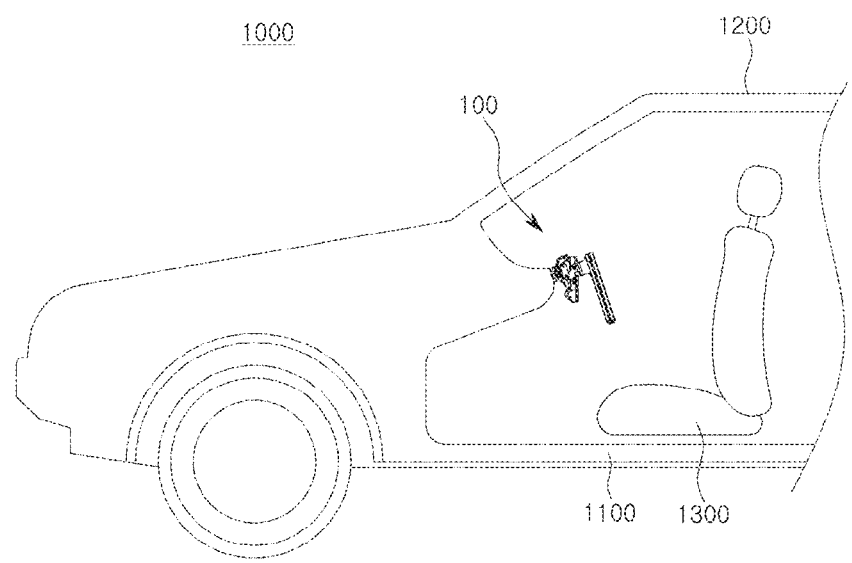
FIG. 8A, FIG. 8B, FIG. 8C, FIG. 8D and FIG. 8E are reference diagrams illustrating an example in which a steering wheel is applied to a vehicle according to an exemplary embodiment of the present disclosure.
Figure 8B:
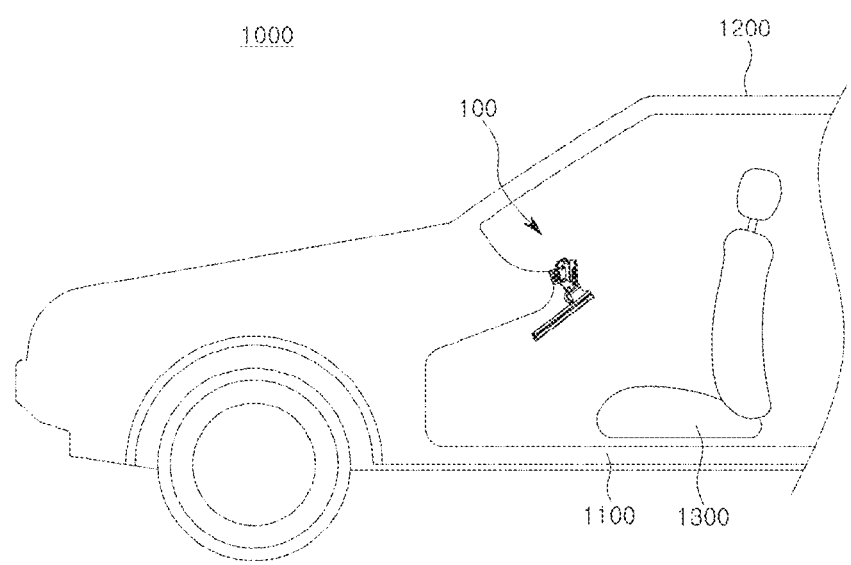
Figure 8C:
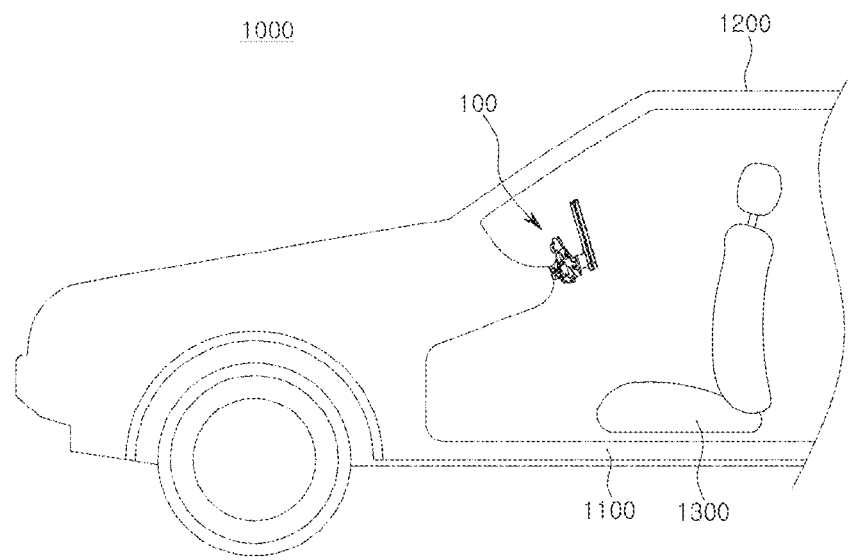
Figure 8D:
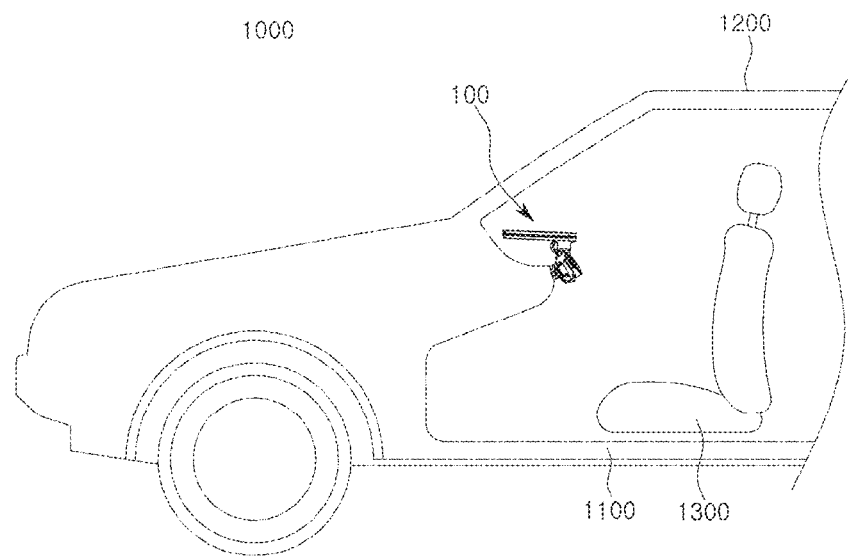
Figure 8E:
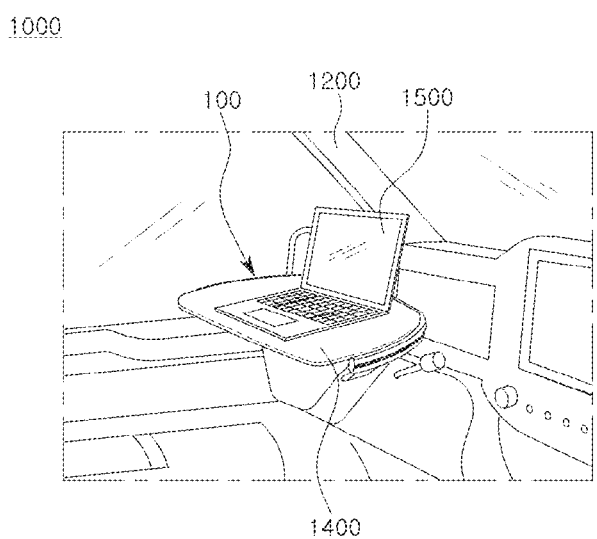

FIG. 8A illustrates the steering wheel 100 of the exemplary embodiment provided in a vehicle, FIG. 8B illustrates the steering wheel 100 of the exemplary embodiment folded downwardly, FIG. 8C illustrates the steering wheel 100 of the exemplary embodiment of the present disclosure rotated so that the wheel rim 120 is located at the top, FIG. 8D illustrates the steering wheel 100 folded upwardly, and FIG. 8E is a reference diagram of the state of FIG. 8D as viewed from the interior of the vehicle.

The vehicle may include a frame 1100 and a body 1200 and may be provided with a driver's seat including a seat 1300 on which the driver may sit. The steering wheel 100 of the exemplary embodiment of the present disclosure may be provided in front of the driver's seat.

FIG. 8A illustrates the steering wheel 100 provided in the vehicle in a deployed state, and FIG. 8B illustrates the steering wheel 100 provided in the vehicle in a downwardly folded state. It may be seen that, compared to FIG. 8A, an internal space of the vehicle may be more widely utilized by the folded steering wheel 100 illustrated in FIG. 8B.

Next, referring to FIGS. 8A and 8C to 8E, when the steering wheel 100 is rotated 180 degrees in the state of FIG. 8A, the steering wheel 100 provided in the vehicle may be located to be foldable upwardly, and when it is folded in an upward direction, the steering wheel 100 may be folded in a substantially flat state or slightly tilted toward the driver as illustrated in FIG. 8C. Furthermore, a support plate 1400 may be mounted on the wheel rim 120 and a laptop 1500, etc. may be disposed on top of it for convenient use. of course, the internal space of the vehicle may be utilized more widely by the folded steering wheel 100 illustrated in FIGS. 8D and 8E.

As described above with reference to FIG. 8A, FIG. 8B, FIG. 8C, FIG. 8D and FIG. 8E, the foldable steering wheel 100 of the exemplary embodiment of the present disclosure may be a folding type in which the wheel rim 120 rotates, providing driver convenience in entering or exiting a vehicle, and when the ignition is terminated while the vehicle is stopped, the steering wheel may rotate downwardly and move in the opposite direction of the driver, securing space in the driver's seat and making it convenient for the driver exit the vehicle, of course, driver convenience may increase in the same manner with a wide driver's seat space when the driver gets on the driver's seat.

Furthermore, as another example of using the foldable steering wheel 100 of the exemplary embodiment, in a driver's seat relaxation mode, when the driver's seat footrest and seat cushion is raised and the seat backrest is laid back, the steering wheel may be rotated and moved to secure space for the driver's feet and knees, increasing the driver's space utilization.

The foldable steering wheel according to an exemplary embodiment of the present disclosure may provide operational safety and consistency through a simplified structure, while simultaneously resolving power transmission and locking structures.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A steering wheel comprising:
   an armature body;
   a wheel rim coupled to the armature body to be foldable;
   a slider disposed on the armature body to move linearly while being coupled to the wheel rim to be rotatable about a first rotation axis;
   a link including a first end portion rotatably coupled to the wheel rim about a second rotation axis, different from the first rotation axis, and a second end portion coupled to the armature body to be rotatable about a third rotation axis; and
   a driving unit engaged to the slider and providing power for a linear motion to the slider,
   wherein the third rotation axis is fixed to the armature body.

2. The steering wheel of claim 1,
   wherein the slider is in pair, and
   wherein the pair of sliders are mounted on first and second sides of the steering wheel.

3. The steering wheel of claim 1, wherein the armature body includes a guide member, and the slider moves linearly inside the guide member.

4. The steering wheel of claim 3, wherein the guide member is disposed together with a gearbox accommodating the driving unit.

5. The steering wheel of claim 1, wherein the first rotation axis moves together with the slider.

6. The steering wheel of claim 5, wherein the second rotation axis moves according to the motion of the slider.

7. The steering wheel of claim 1, wherein the first rotation axis, the second rotation axis, and the third rotation axis are provided in parallel.

8. The steering wheel of claim 1, wherein the driving unit includes:
   a rotary motor;
   a worm wheel connected to the rotary motor; and
   a worm gear engaged to the worm wheel,
   wherein the slider is coupled to move linearly along a shaft connected to the worm gear.

9. The steering wheel of claim 8, wherein an internal surface of the slider and an external surface of the shaft selectively include a female thread or a male thread and are mutually coupled together so that the slider moves linearly by rotation of the shaft.

10. The steering wheel of claim 9,
    wherein the slider is in pair, the worm wheel is in pair and the worm gear is in pair, and
    wherein the pair of worm wheels and the pair of worm gears are connected to first and second sides of the rotary motor, respectively.

11. The steering wheel of claim 10,
    wherein the armature body includes a guide member and the guide member is disposed together with a gearbox accommodating the driving unit, and
    wherein the gearbox is provided in a U-shape.

12. The steering wheel of claim 11,
    wherein the guide member includes an opening parallel to a moving direction of the slider, and
    wherein the slider implementing the first rotation axis and the wheel rim are connected through the opening.

13. The steering wheel of claim 1, wherein the second rotation axis moves both in a moving direction of the slider and in a direction, perpendicular to the moving direction of the slider.

14. A vehicle comprising:
    a body including a driver's seat; and
    the steering wheel of claim 1 coupled to the body and provided in front of the driver's seat for steering.

15. The vehicle of claim 14, wherein the armature body includes a guide member, and the slider moves linearly inside the guide member.

16. The vehicle of claim 14, wherein the first rotation axis moves together with the slider.

17. The vehicle of claim 16,
    wherein the second rotation axis moves according to the motion of the slider.

18. The vehicle of claim 14, wherein the first rotation axis, the second rotation axis, and the third rotation axis are provided in parallel.

19. The vehicle of claim 14, wherein the driving unit includes:
    a rotary motor;
    a worm wheel connected to the rotary motor; and
    a worm gear engaged to the worm wheel,
    wherein the slider is coupled to move linearly along a shaft connected to the worm gear.

* * * * *